United States Patent [19]
Miyazaki et al.

[11] Patent Number: 5,804,330
[45] Date of Patent: Sep. 8, 1998

[54] PACKAGED ELECTRODE PLATE FOR SECONDARY BATTERY WITH NONAQUEOUS ELECTROLYTE

[75] Inventors: Yuichi Miyazaki; Shin Miyanowaki; Yasushi Sato; Tadafumi Shindo; Kazuo Umeda, all of Tokyo-to, Japan

[73] Assignee: Dai Nippon Printing Co., Ltd., Japan

[21] Appl. No.: 914,325

[22] Filed: Aug. 19, 1997

[30] Foreign Application Priority Data

Aug. 28, 1996 [JP] Japan ................................. 8-244046

[51] Int. Cl.⁶ ......................................................... H01M 6/00
[52] U.S. Cl. ............................. 429/48; 429/94; 429/96; 429/127
[58] Field of Search .............................. 429/48, 94.96, 429/99, 100, 113, 110, 127

[56] References Cited

U.S. PATENT DOCUMENTS 3,357,864  12/1967  Huber ........................................ 429/113
4,000,351  12/1976  Hug et al. .................................. 429/94
4,539,273   9/1985  Goebel ...................................... 429/94

*Primary Examiner*—Anthony Skapars
*Attorney, Agent, or Firm*—Ladas & Parry

[57] ABSTRACT

A packaged electrode plate for a secondary battery with a nonaqueous electrolyte comprises: an airtight container having a winding core and a tape pulling-out opening; and a wound tape comprising an electrode plate for a secondary battery with a nonaqueous electrolyte. The wound tape is stored in the airtight container and supported on the winding core thereof. A forward end of the wound tape is pulled out from the tape pulling-out opening of the airtight container, and the tape pulling-out opening is hermetically closed by means of an airtight sealing means which holds the forward end of the wound tape pulled out from the tape pulling-out opening.

5 Claims, 7 Drawing Sheets

PACKAGED ELECTRODE PLATE FOR SECONDARY BATTERY WITH NONAQUEOUS ELECTROLYTE

BACKGROUND OF THE INVENTION

1. Field of the Invention

The present invention relates to an electrode plate for a secondary battery with a nonaqueous electrolyte, which can be exemplified by a lithium ion secondary battery.

2. Description of the Related Art

In recent years, reduction in size and weight of electronic equipment and communication equipment has rapidly been advanced. This advance has also required reduction in size and weight of secondary batteries used as a driving power source for these equipment. In view of this requirement, there has been proposed commercialization of secondary batteries with a nonaqueous electrolyte with respect to which lithium ion secondary batteries having high voltage and high energy density were exemplified as an typical example.

Regarding an electrode plate which has a great influence on the performance of the secondary batteries with a nonaqueous electrolyte, there are known methods for increasing the area of the electrode plate which is wound in the battery, by reducing the thickness of the electrode in order to prolong the charge-discharge cycle life and to increase the energy density.

For example, Japanese Patent Laid-Open Nos. 10456/1988 and 285262/1991 disclose a process for producing a positive electrode plate, which comprises the steps of: dispersing and dissolving an active material powder for a positive electrode plate, which comprises metallic oxides, sulfides, halides and the like, conductive agents and a binder into a suitable wetting agent (i.e., a solvent) to prepare an active material coating composition in the form of paste, and applying the above-mentioned active material coating composition on the surface of a collector as a substrate, made of a metallic foil to prepare a coating layer (i.e., an active material layer) for a positive electrode plate. In the preparation of such a positive electrode plate, there is used as a binder, fluororesins such as polyvinylidene fluoride; silicone-acrylic copolymer; styrene-butadiene copolymer, and the like.

In the production of such an electrode plate, an active material layer (i.e., a positive electrode plate) having a function of emitting lithium ions or an active material layer (i.e., a negative electrode plate) having a function of adsorbing these lithium ions is formed on the both surfaces of a collector made of an aluminum foil, a copper foil or the like, there are provided, on the active material layer, portions to which terminals are to be connected, as shown in FIG. 1, and then, the collector having on the both surface thereof the respective active material layer is cut along a dotted line as shown in FIG. 1A into a plurality of tapes having a width corresponding to the size of a secondary battery to be finally assembled, as shown in FIG. 2.

A distance between the portions to which the terminals are to be connected in each of the tape-shaped electrodes (hereinafter referred to as the "tape") is determined in accordance with the size of the secondary battery to be finally assembled. Such a tape has for example a length of from about 200 to 500 m, and is wound into a disc having a diameter of from about 20 to 40 cm, and the thus wound tape is used in an assembling step of the secondary battery.

The above-mentioned wound tape of the electrode plate (hereinafter simply referred to as the "wound tape") is subjected to the assembling step of the secondary battery, and the positive electrode plate and the negative electrode plate are arranged in a vessel for the battery so that they and a separator arranged between them for preventing their short circuit are wound in a piled up state. However, the moisture absorption of the electrode plate causes deterioration of the electrode performance. Therefore, there is imposed on a manufacturer a strict condition that the moisture absorption of the electrode plate should completely be prevented during the period of time between the preparation of the tape and the completion of the assembling step of the battery. According to the conventional method, in order to meet such a strict condition, the tape wound into a roll after the completion of the cutting step has been subjected to a vacuum drying treatment, and then, the wound tape has been stored in a airtight container such as a plastic bag, and it has been transported in this state, until the assembling step of the battery has been carried out. The assembling step has been carried out in a room the atmosphere of which was kept in a dried condition.

In the above-mentioned conventional method, a portion of the wound tape may come into contact with another portion thereof when storing, after the completion of the vacuum drying step, the wound tape in the airtight bag, after storing the wound tape therein and during transportation of the airtight bag in which the wound tape is stored. Such contact may cause the active material layer to be peeled, thus resulting in occurrence of defective products. Also in the assembling step of the battery, such defective products may occur under the same reasons as mentioned above from the time when the wound tape is took out from the airtight bag to the time when the winding step of the positive and negative electrodes is carried out. Such defective products lead to serious uneconomical problems in the production of the batteries, because of a high production cost of the tape.

SUMMARY OF THE INVENTION

An object of the present invention is therefore to provide an electrode plate for a secondary battery with a nonaqueous electrolyte, which permits to solve the above-described problems, to prevent the moisture absorption of the wound tape after the preparation of the wound tape up to the assembling of the battery, and to avoid the occurrence of defective products due to the peeling of the active material layer, or the like.

In order to attain the object of the present invention, a packaged electrode plate for a secondary battery with a nonaqueous electrolyte, comprises: an airtight container having a winding core and a tape pulling-out opening; and at least one wound tape comprising an electrode plate for a secondary battery with a nonaqueous electrolyte, in which an active material layer is formed on a collector, said wound tape being stored in said airtight container and supported on said winding core thereof; a forward end of said wound tape is pulled out from said tape pulling-out opening of said airtight container, and said tape pulling-out opening is hermetically closed by means of an airtight seal which holds said forward end of said wound tape pulled out from said tape pulling-out opening.

The above-mentioned airtight container may be filled with an inert gas.

The above-mentioned tape may have at a forward end portion thereof a leading tape.

The above-mentioned airtight container may have at on the wall thereof a gas introducing opening which can hermetically be closed, and an atmosphere in said airtight container may be kept in a drying condition.

The above-mentioned at least one wound tape may comprise a plurality of wound tapes.

DETAILED DESCRIPTION OF THE PREFERRED EMBODIMENTS

Now, the present invention will be described in detail below.

Figure 1A:
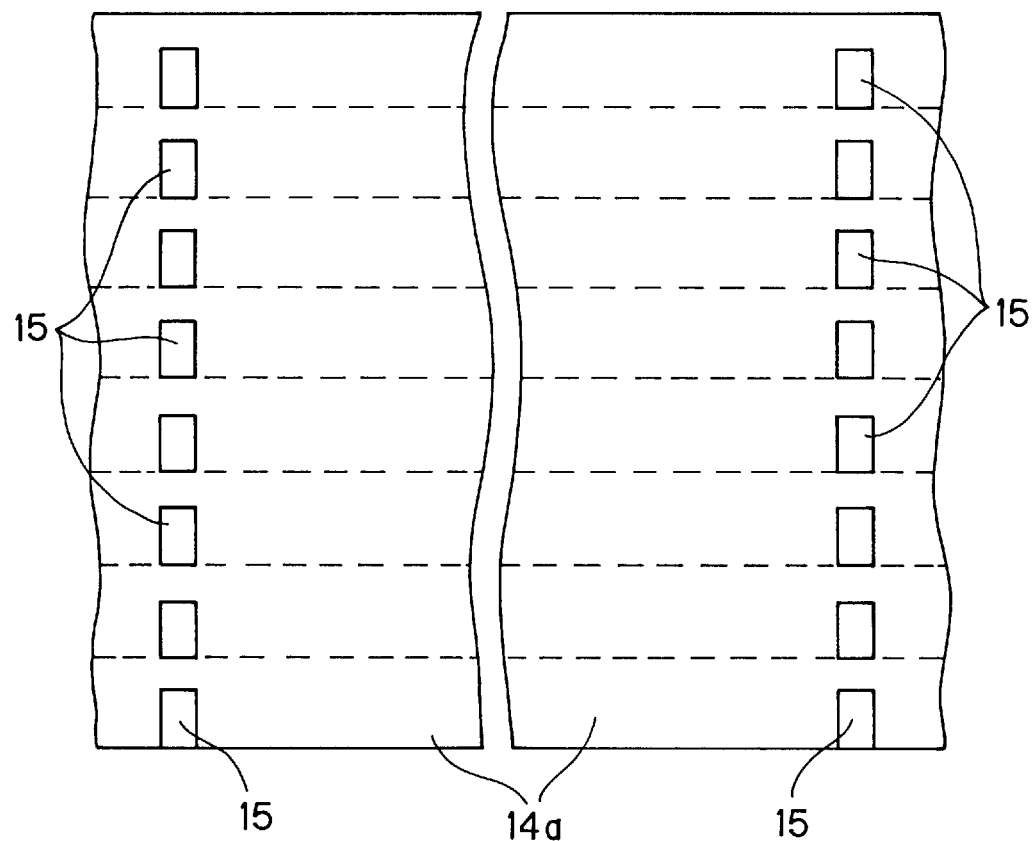
FIG. 1A is a schematic descriptive plan view illustrating a plurality of electrode plates for secondary batteries with nonaqueous electrolytes used in the present invention.
Figure 1B:
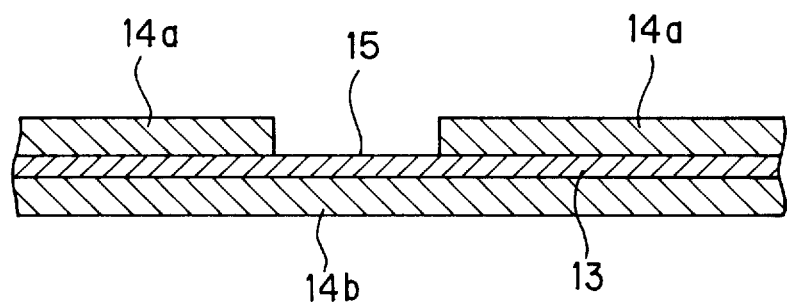
FIG. 1B is a schematic descriptive sectional view illustrating the electrode plate as shown in FIG. 1A.
Figure 2:
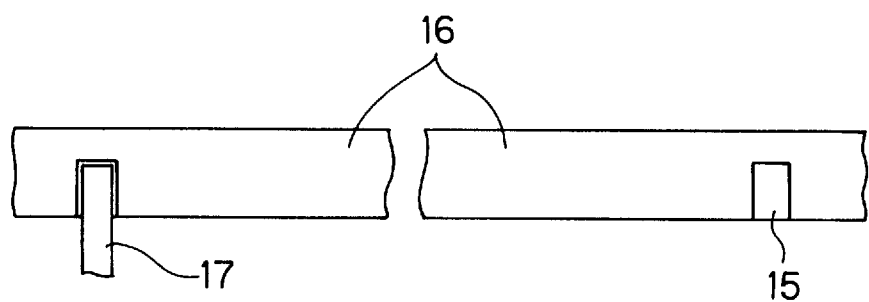
FIG. 2 is a schematic descriptive plan view illustrating the single electrode plate of the plurality of electrode plates as shown in FIG. 1A, in which a terminal is connected.
Figure 3:
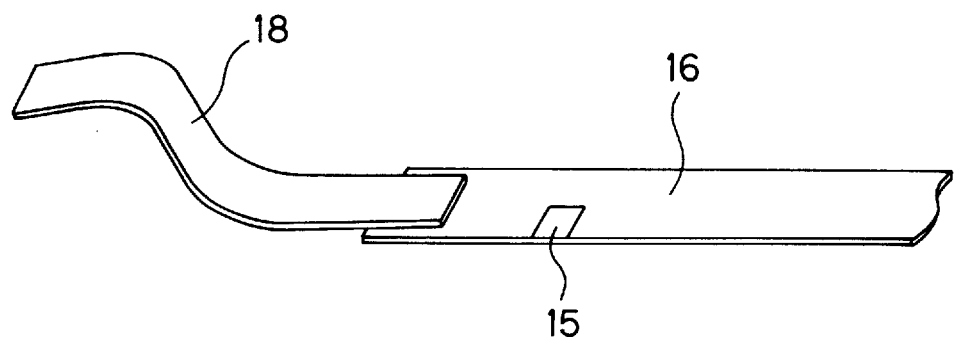
FIG. 3 is a schematic descriptive perspective view illustrating the electrode plate for a secondary battery with a nonaqueous electrolyte used in the present invention, which has a leading tape.

As is clear from FIGS. 1 and 2, According to a method used in the present invention, for manufacturing a tape 16 comprising an electrode plate for a secondary battery with a nonaqueous electrolyte, an active material layer 14a (14b) is formed on the both surfaces of a long-sized collector 13 made of an aluminum foil, a copper foil or the like having a width of from about 300 to 600 mm, and then, portions 15 to which terminals are to be connected (i.e., portions on which the active material layer is not formed), are formed on prescribed portions of the collector 13, as shown in FIG. 1A and 1B. The collector 13 having on the both surface thereof the respective active material layer 14a, 14b is cut along a dotted line as shown in FIG. 1A into a plurality of tapes 16 having a width corresponding to the size of a secondary battery to be finally assembled, as shown in FIG. 2. The single tape 16 of these tapes is shown in FIG. 2, and has a width of for example 20 to 70 mm.

After the completion of the above-mentioned cutting step, the tape 16 having a length of for example about 200 to 500 m is wound on a winding core such as a steel pipe or the like into a roll, and the thus wound tape T is dried in a vacuum condition. In this stage, the wound tape T has a diameter of about 200 to 400 mm. Such steps are identical to those in the conventional method. The wound tape T used in the present invention may be prepared by any one of the conventional methods.

According to the present invention, the wound tape T is stored in an airtight container 1 after the completion of the vacuum drying step. The airtight container 1 is made of plastic or metal. Smaller thickness and lighter weight of the container are preferable so long as the required airtightness and strength are obtained. The airtight container 1 may have any shape of a rectangular parallelepiped, a hexagonal column, an octagonal column, a cylindrical column, or the like. The container 1 having the rectangular parallelepiped shape as an exemplary shape, made of plastic will be described below, although the shape thereof is not limited thereto.

Figure 4:
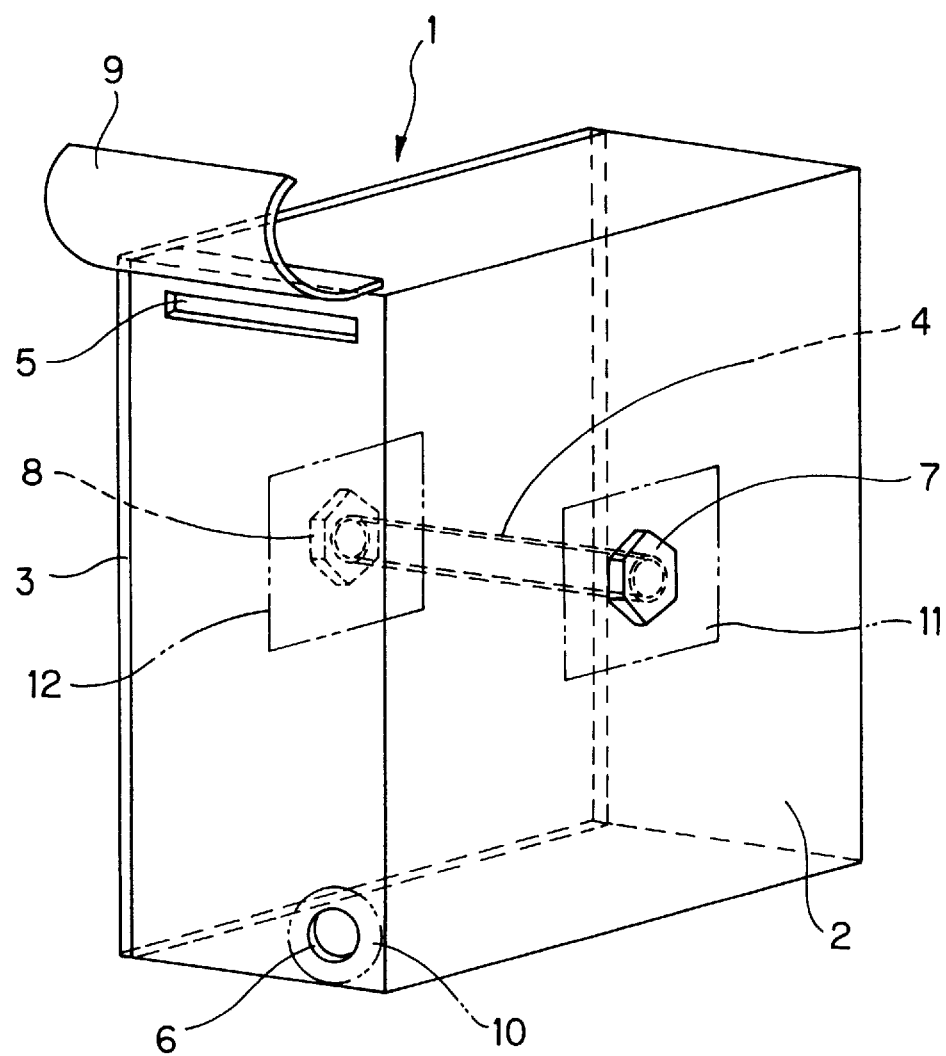
FIG. 4 is a schematic descriptive perspective view illustrating an airtight container used in the present invention.

The container 1 having the rectangular parallelepiped shape comprises a main body 2 having a wide opening, and a side plate 3 (i.e., a lid) having a hole at the center portion thereof, which is to be fitted to the wide opening of the container body 1, as shown in FIG. 4. The main body 2 has at the upper end portion of its front wall a tape pulling-out opening 5. The main body 1 and the side plate 3 are formed by means of the conventional molding method such as an injection molding or the like of synthetic resin such as polyethylene, polypropylene or the like. A winding core 4 for supporting the wound tape T (not shown in FIG. 4) is secured to the main body 2. The steel pipe serving as the winding core 4 used in the above-described drying step of the electrode may be used as the winding core 4 to be secured to the main body 2. A tape tightening means 7 is provided at the one end of the winding core 4. The winding core 4 may have a fastening means for the end of the wound tape T, such as a slit, a pinching mechanism, although it is not shown in the figures. The above-mentioned tape tightening means 7 may have a stopper for preventing the tape from being loosened, although it is not shown in the figures.

Figure 5:
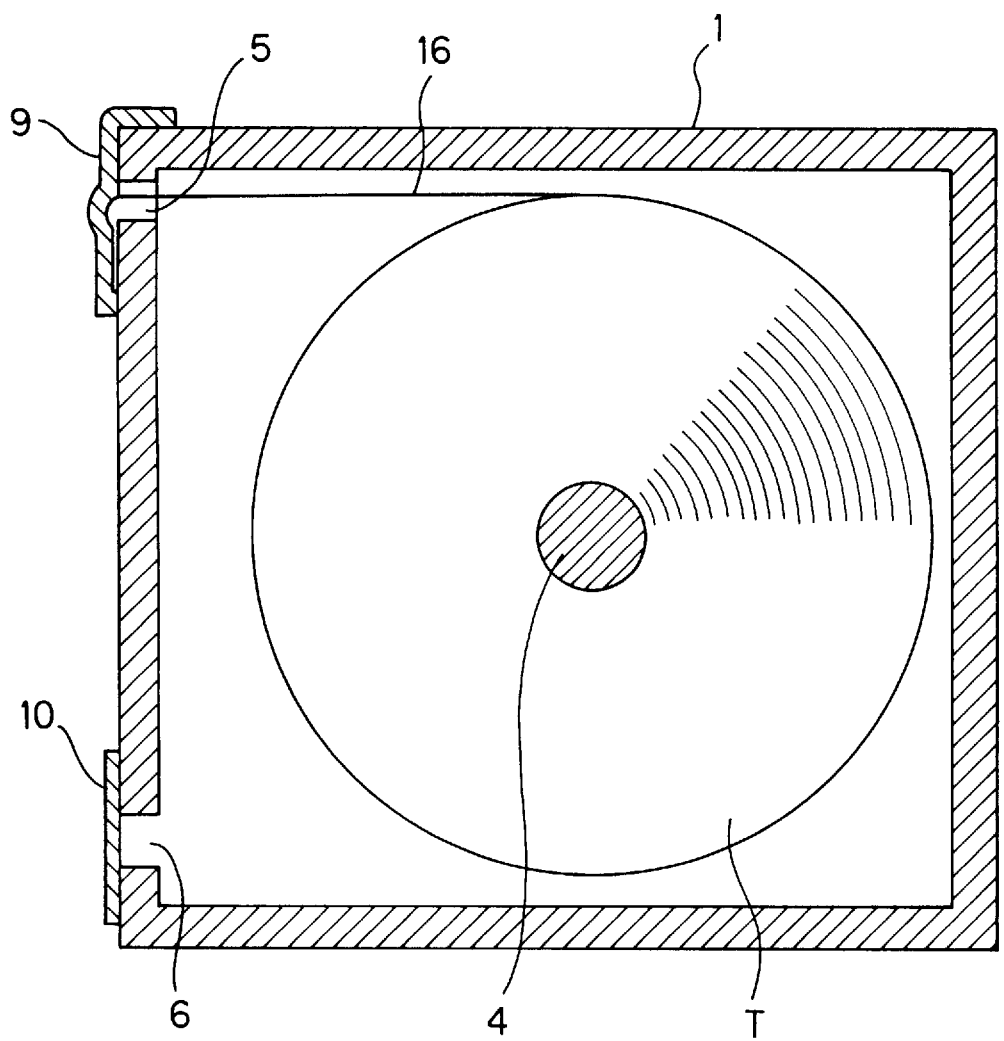
FIG. 5 is a schematic descriptive sectional view illustrating the airtight container as shown in FIG. 4 in which a wound tape is stored, in accordance with the present invention.
Figure 6:
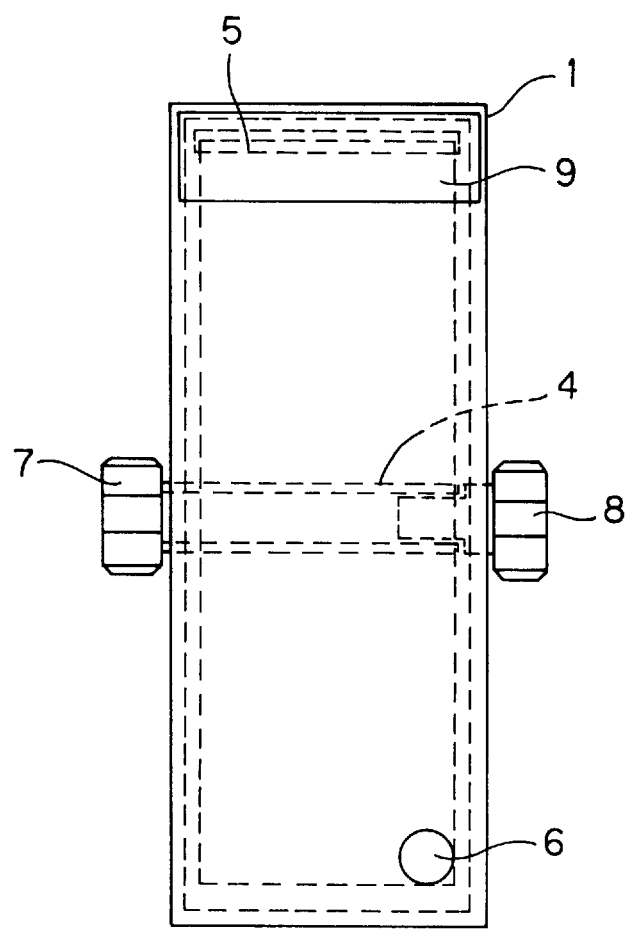
FIG. 6 is a schematic descriptive front view illustrating the airtight container as shown in FIG. 4.
Figure 7:
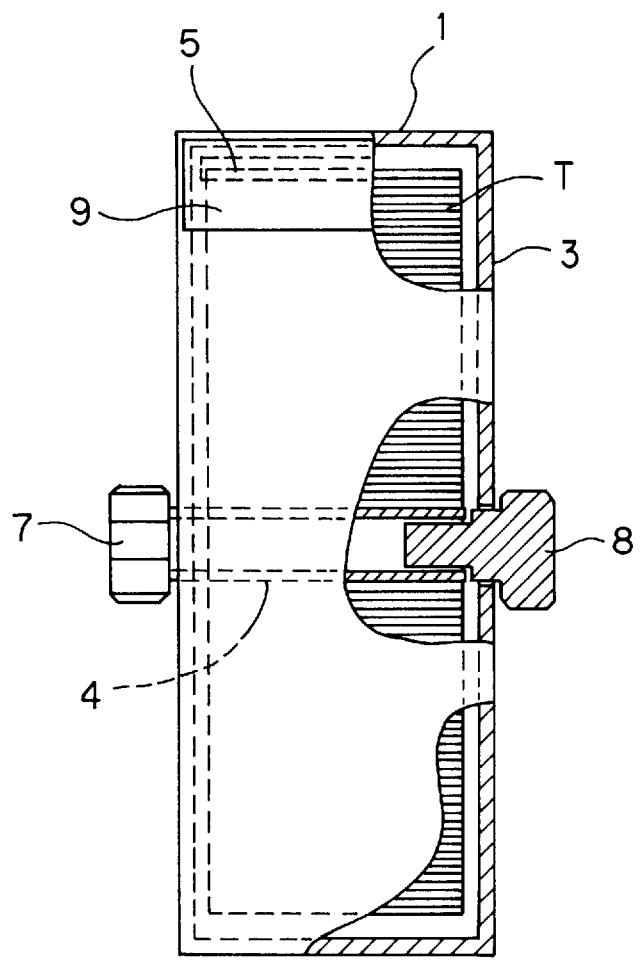
FIG. 7 is a schematic descriptive front view illustrating the airtight container as shown in FIG. 4, in which a side plate thereof is broken.

The wound tape T after the completion of the vacuum drying step is inserted into the main body 2 of the container 1 having the shape as shown in FIG. 4 from the wide opening thereof and then is supported on the winding core 4. Then, the forward end of the wound tape T is pulled out and inserted into the tape pulling-out opening 5 of the main body 2 so that the forward end thereof is projected from the tape pulling-out opening 5 by a prescribed length, as shown in FIG. 5 which is a schematic descriptive sectional view of FIG. 4, in FIG. 6 which is a schematic descriptive front view of FIG. 4 and in FIG. 7 which is a schematic descriptive front view of FIG. 4, in which the side plate thereof is broken. The side plate 3 is fitted into the wide opening of the main body 2, and a bolt as a side plate fastening means 8 is inserted into the hole of the side plate 3 and secured to the other end of the winding core 4 so that the side plate 3 is fixed to the winding core 4. Although the relationship between the inner surface of the winding core 4 and the bolt as a side plate fastening means 8 is not illustrated in the figures, the winding core 4 may have at the other end thereof a threaded hole to which the bolt is to be screwed, or a non-threaded hole into which the bolt is to be fitted by force. Thus, the wide opening of the main body 2 is closed by the side plate 3. An opening 6 for introducing a drying gas such as nitrogen gas into the container 1 may be formed on any side wall of the main body 2, in order to maintain an atmosphere in the container 1 in a drying condition.

Then, as shown in FIG. 5, the tape pulling-out opening 5 of the container 1 is hermetically closed by means of an airtight sealing means 9 such as a sealing tape. In this state, the airtight sealing means 9 holds the forward end of the wound tape T pulled out from the tape pulling-out opening 5. The gas introducing opening 6 and the other openings, i.e., the openings for the winding core 4, formed in the container 1 are also hermetically closed by means of the other airtight sealing means 10, 11, 12. The tape tightening means 7 or the side plate fastening means 8 may be rotated to impart an appropriate tension to the tape 16 stored in the container 1, as the occasion demands.

Although the electrode plate for a secondary battery with a nonaqueous electrolyte can be obtained in the above-described manner, the production method can be modified in the present invention. In the above-described method, the wound tape T after the completion of the vacuum drying step is stored in the airtight container 1. The wound tape T stored in the main body 2 of the airtight container 1 may however be subjected to the vacuum drying step. An appropriate moisture preventing treatment may be applied to the pre-scribed portions of the airtight container 1, or a desiccating agent may be arranged at an appropriate place in the airtight container 1. It is preferable to substitute air in the airtight container by an inert gas such as nitrogen gas or the like prior to the application of the airtight sealing means 9, 10, 11, 12 onto the container 1, and then to apply the airtight sealing means thereto.

Figure 8:
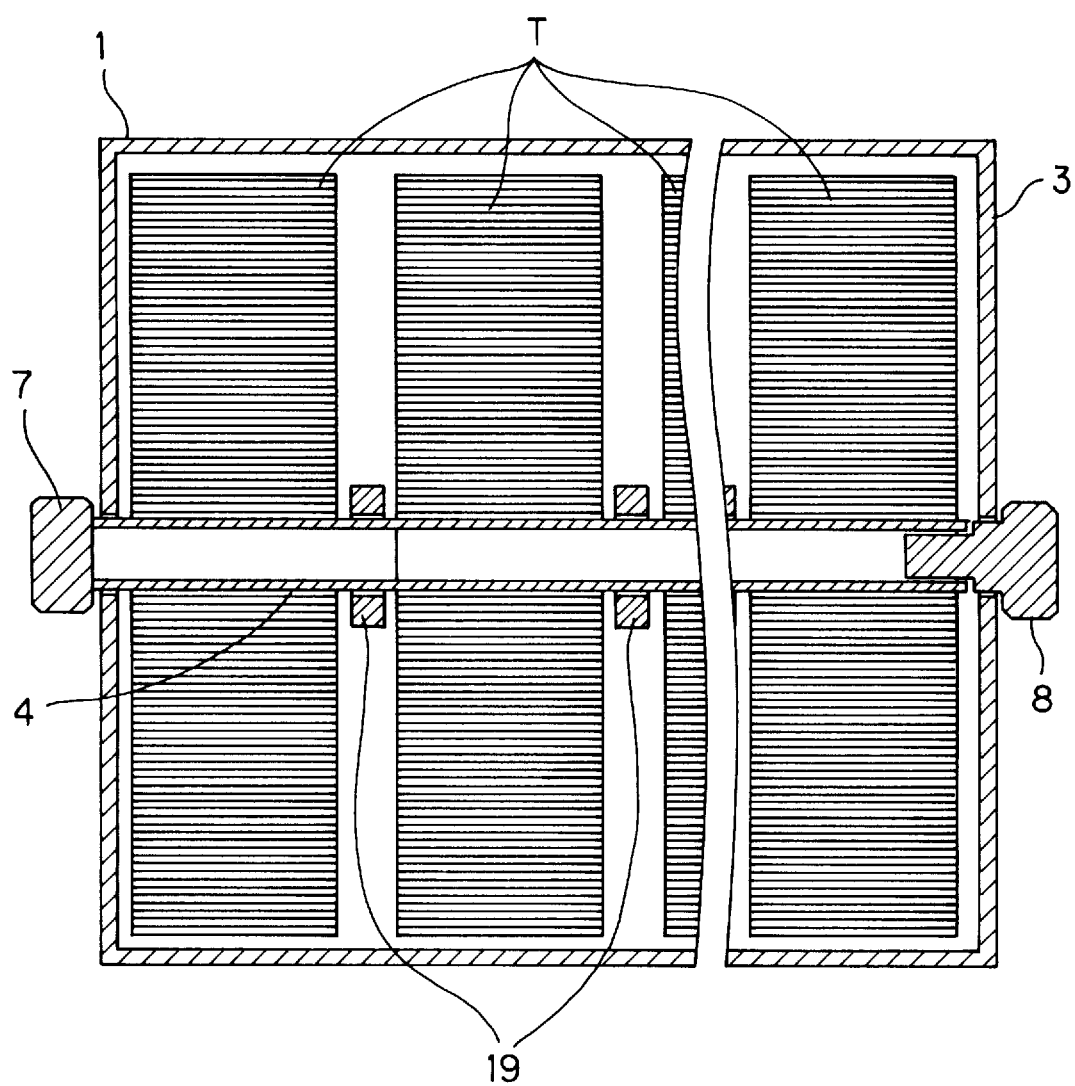
FIG. 8 is a schematic descriptive sectional view illustrating an airtight container in which a plurality of wound tapes are stored, in accordance with the present invention.

In the above description, the single wound tape T is stored in the airtight container 1. A plurality of wound tapes T may however be stored in the airtight container 1. FIG. 8 illustrates this embodiment. According to this embodiment, it is possible to improve the storing capacity of the container 1 by storing the plurality of wound tapes T between which a plurality of spacers 19 are inserted, in the airtight container 1.

The above-mentioned packaged electrode plate for a secondary battery with a nonaqueous electrolyte is transported in a place in which an assembling step of the battery is to be carried out. The packaged electrode plate is set on a positive electrode supplier and/or a negative electrode supplier in a battery assembling apparatus. Then, the sealing tape 9 as an airtight sealing means is peeled from the tape pulling-out opening 5, together with the forward end of the wound tape T. Then, the forward end of the wound tape T is pulled out from the tape pulling-out opening 5 and is supplied into an electrode winding section of the battery assembling apparatus. In the battery assembling apparatus, the positive electrode plate, the negative electrode plate and a separator arranged therebetween for preventing their short circuit are wound in a piled up state, thus preparing an electrode having a prescribed shape, which is to be arranged in a vessel for the battery. Terminals such as lead wires are connected to the positive and negative electrode plates when the above-mentioned winding step of the positive and negative electrode plates is carried out. When the entire of the tape is pulled out, the empty airtight container is returned to the electrode tape preparing step, and then, a newly prepared electrode tape is stored in the container.

EXAMPLES

Now, the present invention will be described hereinbelow in more detail with reference to Experiment Examples.

Experiment Example 1

A main body, a side plate, a tape tightening means and a side plate fastening means as shown in FIG. 4 were prepared by an injection molding with the use of polypropylene having a specific gravity of 0.9. The main body had a length of 350 mm, a width of 80 mm, a height of 350 mm and a thickness of 8 mm. The side plate had a length of 350 mm, a height of 350 mm and a thickness of 8 mm. The main body had a circular hole having a diameter of 3 inches formed at the center portion thereof, and the side plate also had a circular hole having a diameter of 3 inches formed at the center portion thereof The main body had a rectangular tape pulling-out opening having a short side of 10 mm and a long side of 70 mm, and a circular gas introducing opening having a diameter of 10 mm.

Then, a coating composition for a positive electrode, containing active material for the positive electrode was prepared in the following manner. As materials for the coating composition for the positive electrode, there were used $LiCoO_2$ powder of 40 wt. parts having a particle size of from 1 to 100 $\mu$m and an average particle size of 10 $\mu$m, graphite powder of 5.0 wt. parts as a conductive agent, polyvinylidene fluoride of 5 wt. parts as a binder (having the product name of "NEOFLON VDF, VP-850" manufactured by DAIKIN INDUSTRIES, CO. LTD.) and N-methylpyrrolidone of 25 wt. parts.

Of these materials, polyvinylidene fluoride was previously dissolved by N-methylpyrrolidone to prepare varnish. The other powdery materials were added to the thus prepared varnish, and these powdery materials and the varnish were stirred and mixed by means of a planetary mixer (manufactured by KODAIRA SEISAKUSHO CO. LTD.) for a period of time of 30 minutes, to prepare a coating composition in a form of slurry for the positive electrode containing the active material for the positive electrode.

With the use of the thus prepared coating composition for the positive electrode, a coating step was carried out on the both surfaces of a collector made of an aluminum foil having a thickness of 20 $\mu$m and a width of 300 mm by means of a die coater. Then, a drying step was carried out at a temperature of 140° C. for 2 minutes to form a coating layer on the both surfaces of the aluminum foil, which included the active material for the positive electrode and had a thickness of 120 $\mu$m in a drying state. The resultant coating layer including the active material for the positive electrode was subjected to an aging treatment in a vacuum oven at a temperature of 80° C. for 48 hours to remove moisture in the coating layer, thereby preparing an electrode plate for the positive electrode.

The thus prepared electrode plate for the positive electrode was slit into a plurality of tapes each having a width of 60 mm and a length of 300 m. The tape of the electrode plate was wound on a steel pipe having a diameter of 3 inches to prepare a wound tape. The thus prepared wound tape was inserted into the main body of the container from the wide opening thereof and then was supported on the winding core. Then, the forward end of the wound tape was pulled out and inserted into the tape pulling-out opening of the main body so that the forward end thereof was projected from the tape pulling-out opening by a prescribed length. The side plate was fitted into the wide opening of the main body, and a bolt as a side plate fastening means was inserted into the hole of the side plate and secured to the other end of the winding core so that the side plate was fixed to the winding core.

Then, nitrogen gas as a drying gas was introduced into the container from the gas introducing opening formed on the side of the main body to substitute completely air in the container by the drying nitrogen gas. Then, the tape pulling-out opening of the container was hermetically closed by means of a sealing tape as an airtight sealing means through the conventional heat-sealing method. In this state, the sealing tape held the forward end of the wound tape pulled out from the tape pulling-out opening. The gas introducing opening was also hermetically closed by means of another sealing tape as an airtight sealing means through the heat-sealing method.

The gap between the tape tightening means and the main body, and the gap between the side plate fastening means and the side plate were hermetically sealed by applying the other sealing tapes thereto through the heat-sealing method, thereby preparing a packaged electrode plate for a secondary battery with a nonaqueous electrolyte of the present invention.

The above-described sealing tapes were prepared by adhering a polyethylene terephthalate film having a thickness of 12 mm and a polypropylene film having a thickness of 25 μm to the lower surface of an aluminum foil having a thickness of 7 μm. The sealing tape for the tape pulling-out opening had a rectangular shape of a short side of 20 mm and a long side of 80 mm. The sealing tape for the gas introducing opening had a circular shape having a diameter of 20 mm. The sealing tapes for the tape tightening means and the side plate fastening means had a square shape having a size of 5×5 inches. The heat-sealing method was applied in a condition that the polypropylene layer as a lowermost layer of the sealing tape was brought into contact with the container.

The packaged electrode plate for a secondary battery with a nonaqueous electrolyte of the present invention was left alone for a period of one week, and then, humidity in the airtight container was measured. As a result, it was recognized that an atmosphere in the airtight container was maintained in a complete drying condition.

Experiment Example 2

There were prepared the same main body, side plate, tape tightening means and side plate fastening means as those in the Experiment Example 1.

Then, a coating composition for a negative electrode, containing active material for the negative electrode was prepared in the following manner. As materials for the coating composition for the negative electrode, there were used graphite powder of 85 wt. parts, polyvinylidene fluoride of 20 wt. parts having the product name of "NEOFLON VDF, VP-850" manufactured by DAIKIN INDUSTRIES, CO. LTD.) and N-methylpyrrolidone as a dispersing medium of 250 wt. parts. A coating composition in a form of slurry for the negative electrode was obtained with the use of these materials by means of the same dispersing machine in the same dispersing method as in the Experiment Example 1.

With the use of the thus prepared coating composition for the negative electrode, a coating step was carried out on the both surfaces of a collector made of a rolled copper foil having a thickness of 15 μm by means of a die coater. Then a drying step was carried out at a temperature of 140° C. for 2 minutes to form a coating layer on the both surfaces of the copper foil, which included the active material for the negative electrode and had a thickness of 120 μm in a drying state. The resultant coating layer including the active material for the negative electrode was subjected to the same aging treatment as that in the Experiment Example 1 to remove moisture in the coating layer, thereby preparing an electrode plate for the negative electrode.

A packaged electrode plate for a secondary battery with a nonaqueous electrolyte of the present invention was prepared in the same manner as in the Experiment Example 1 except that the electrode plate for the negative electrode described above was used in place of the electrode plate for the positive electrode.

The packaged electrode plate for a secondary battery with a nonaqueous electrolyte of the present invention was left alone for a period of one week, and then, humidity in the airtight container was measured. As a result, it was recognized that an atmosphere in the airtight container was maintained in a complete drying condition.

According to the present invention as described above in detail, it is possible to provide an electrode plate for a secondary battery with a nonaqueous electrolyte, which permits to prevent the moisture absorption of the wound tape after the preparation of the wound tape up to the assembling of the battery, and to avoid the occurrence of defective products due to the peeling of the active material layer, or the like.

What is claimed is:

1. A packaged electrode plate for a secondary battery with a nonaqueous electrolyte, which comprises:

an airtight container having a winding core and a tape pulling-out opening; and at least one wound tape comprising an electrode plate for a secondary battery with a nonaqueous electrolyte, in which an active material layer is formed on a collector, said wound tape being stored in said airtight container and supported on said winding core thereof;

a forward end of said wound tape being pulled out from said tape pulling-out opening of said airtight container, and said tape pulling-out opening being hermetically closed by means of an airtight sealing means which holds said forward end of said wound tape pulled out from said tape pulling-out opening.

2. A packaged electrode plate for a secondary battery with a nonaqueous electrolyte, as claimed in claim 1, wherein:

said airtight container is filled with an inert gas.

3. A packaged electrode plate for a secondary battery with a nonaqueous electrolyte, as claimed in claim 1, wherein:

said tape has at a forward end portion a leading tape.

4. A packaged electrode plate for a secondary battery with a nonaqueous electrolyte, as claimed in claim 1, wherein:

said airtight container has on a wall thereof a gas introducing opening which can hermetically be closed, and an atmosphere in said airtight container can be maintained in a dry condition.

5. A packaged electrode plate for a secondary battery with a nonaqueous electrolyte, as claimed in claim 1, wherein:

said wound tape contains a plurality of wound tapes.

* * * * *